(12) United States Patent
Langhammer

(10) Patent No.: US 8,412,756 B1
(45) Date of Patent: Apr. 2, 2013

(54) MULTI-OPERAND FLOATING POINT OPERATIONS IN A PROGRAMMABLE INTEGRATED CIRCUIT DEVICE

(75) Inventor: Martin Langhammer, Alderbury (GB)

(73) Assignee: Altera Corporation, San Jose, CA (US)

( * ) Notice: Subject to any disclaimer, the term of this patent is extended or adjusted under 35 U.S.C. 154(b) by 803 days.

(21) Appl. No.: 12/557,952

(22) Filed: Sep. 11, 2009

(51) Int. Cl.
*G06F 7/00* (2006.01)
*G06F 15/00* (2006.01)

(52) U.S. Cl. ............... 708/201; 708/205; 708/209

(58) Field of Classification Search .......... None
See application file for complete search history.

(56) References Cited

U.S. PATENT DOCUMENTS

| | | |
|---|---|---|
| 3,473,160 A | 10/1969 | Wahlstrom |
| 3,800,130 A | 3/1974 | Martinson et al. |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |
| 4,484,259 A | 11/1984 | Palmer et al. |
| 4,521,907 A | 6/1985 | Amir et al. |
| 4,575,812 A | 3/1986 | Kloker et al. |
| 4,597,053 A | 6/1986 | Chamberlin |
| 4,616,330 A | 10/1986 | Betz |
| 4,623,961 A | 11/1986 | Mackiewicz |
| 4,682,302 A | 7/1987 | Williams |
| 4,718,057 A | 1/1988 | Venkitakrishnan et al. |
| 4,727,508 A | 2/1988 | Williams |
| 4,736,335 A | 4/1988 | Barkan |
| 4,791,590 A | 12/1988 | Ku et al. |
| 4,799,004 A | 1/1989 | Mori |
| 4,823,295 A | 4/1989 | Mader |
| 4,839,847 A | 6/1989 | Laprade |
| 4,871,930 A | 10/1989 | Wong et al. |
| 4,908,788 A | 3/1990 | Fujiyama |
| 4,912,345 A | 3/1990 | Steele et al. |
| 4,918,637 A | 4/1990 | Morton |

(Continued)

FOREIGN PATENT DOCUMENTS

| | | |
|---|---|---|
| EP | 0 158 430 | 10/1985 |
| EP | 0 380 456 | 8/1990 |

(Continued)

OTHER PUBLICATIONS

Altera Corporation, "Stratix II Device Handbook, Chapter 6—DSP Blocks in Stratix II Devices," v1.1, Jul. 2004.

(Continued)

*Primary Examiner* — Scott Sun
(74) *Attorney, Agent, or Firm* — Ropes & Gray LLP; Jeffrey H. Ingerman

(57) ABSTRACT

A programmable logic device is programmed to add a plurality N of unnormalized numbers at once. Because the inputs are not normalized, they could all have different exponents. The largest exponent of the N exponents is found, and for each of the inputs, its mantissa is right-shifted at by the difference between the largest exponent and the exponent of that particular input. The N shifted mantissas are combined, optionally with sign data, in an (N+1):2 compressor to provide carry and save vectors which may be combined in a carry-propagate adder. Numbers may converted back to normalized form at the end of the operation. If necessary to avoid data loss, a number may be normalized after an intermediate step.

29 Claims, 5 Drawing Sheets

U.S. PATENT DOCUMENTS

| | | | |
|---|---|---|---|
| 4,967,160 A | 10/1990 | Quievy et al. | |
| 4,982,354 A | 1/1991 | Takeuchi et al. | |
| 4,991,010 A | 2/1991 | Hailey et al. | |
| 4,994,997 A | 2/1991 | Martin et al. | |
| 4,999,803 A | 3/1991 | Turrini et al. | |
| 5,073,863 A | 12/1991 | Zhang | |
| 5,081,604 A | 1/1992 | Tanaka | |
| 5,122,685 A | 6/1992 | Chan et al. | |
| 5,128,559 A | 7/1992 | Steele | |
| 5,175,702 A | 12/1992 | Beraud et al. | |
| 5,208,491 A | 5/1993 | Ebeling et al. | |
| RE34,363 E | 8/1993 | Freeman | |
| 5,267,187 A | 11/1993 | Hsieh et al. | |
| 5,296,759 A | 3/1994 | Sutherland et al. | |
| 5,338,983 A | 8/1994 | Agarwala | |
| 5,339,263 A | 8/1994 | White | |
| 5,349,250 A | 9/1994 | New | |
| 5,357,152 A | 10/1994 | Jennings, III et al. | |
| 5,371,422 A | 12/1994 | Patel et al. | |
| 5,373,461 A | 12/1994 | Bearden et al. | |
| 5,375,079 A | 12/1994 | Uramoto et al. | |
| 5,381,357 A | 1/1995 | Wedgwood et al. | |
| 5,404,324 A | 4/1995 | Colon-Bonet | |
| 5,424,589 A | 6/1995 | Dobbelaere et al. | |
| 5,446,651 A | 8/1995 | Moyse et al. | |
| 5,451,948 A | 9/1995 | Jekel | |
| 5,452,231 A | 9/1995 | Butts et al. | |
| 5,452,375 A | 9/1995 | Rousseau et al. | |
| 5,457,644 A | 10/1995 | McCollum | |
| 5,465,226 A | 11/1995 | Goto | |
| 5,465,375 A | 11/1995 | Thepaut et al. | |
| 5,483,178 A | 1/1996 | Costello et al. | |
| 5,497,498 A | 3/1996 | Taylor | |
| 5,500,812 A | 3/1996 | Saishi et al. | |
| 5,500,828 A | 3/1996 | Doddington et al. | |
| 5,523,963 A | 6/1996 | Hsieh et al. | |
| 5,528,550 A | 6/1996 | Pawate et al. | |
| 5,537,601 A | 7/1996 | Kimura et al. | |
| 5,541,864 A | 7/1996 | Van Bavel et al. | |
| 5,546,018 A | 8/1996 | New et al. | |
| 5,550,993 A | 8/1996 | Ehlig et al. | |
| 5,559,450 A | 9/1996 | Ngai et al. | |
| 5,563,526 A | 10/1996 | Hastings et al. | |
| 5,563,819 A | 10/1996 | Nelson | |
| 5,570,039 A | 10/1996 | Oswald et al. | |
| 5,570,040 A | 10/1996 | Lytle et al. | |
| 5,572,148 A | 11/1996 | Lytle et al. | |
| 5,581,501 A | 12/1996 | Sansbury et al. | |
| 5,590,350 A | 12/1996 | Guttag et al. | |
| 5,594,366 A | 1/1997 | Khong et al. | |
| 5,594,912 A | 1/1997 | Brueckmann et al. | |
| 5,596,763 A | 1/1997 | Guttag et al. | |
| 5,606,266 A | 2/1997 | Pedersen | |
| 5,617,058 A | 4/1997 | Adrian et al. | |
| 5,631,848 A | 5/1997 | Laczko et al. | |
| 5,633,601 A | 5/1997 | Nagaraj | |
| 5,636,150 A | 6/1997 | Okamoto | |
| 5,636,368 A | 6/1997 | Harrison et al. | |
| 5,640,578 A | 6/1997 | Balmer et al. | |
| 5,644,519 A | 7/1997 | Yatim | |
| 5,644,522 A | 7/1997 | Moyse et al. | |
| 5,646,545 A | 7/1997 | Trimberger et al. | |
| 5,646,875 A | 7/1997 | Taborn et al. | |
| 5,648,732 A | 7/1997 | Duncan | |
| 5,652,903 A | 7/1997 | Weng et al. | |
| 5,655,069 A | 8/1997 | Ogawara et al. | |
| 5,664,192 A | 9/1997 | Lloyd et al. | |
| 5,689,195 A | 11/1997 | Cliff et al. | |
| 5,696,708 A | 12/1997 | Leung | |
| 5,729,495 A | 3/1998 | Madurawe | |
| 5,740,404 A | 4/1998 | Baji | |
| 5,744,980 A | 4/1998 | McGowan et al. | |
| 5,744,991 A | 4/1998 | Jefferson et al. | |
| 5,754,459 A | 5/1998 | Telikepalli | |
| 5,761,483 A | 6/1998 | Trimberger | |
| 5,764,555 A | 6/1998 | McPherson et al. | |
| 5,768,613 A | 6/1998 | Asghar | |
| 5,771,186 A | 6/1998 | Kodali et al. | |
| 5,777,912 A | 7/1998 | Leung et al. | |
| 5,784,636 A | 7/1998 | Rupp | |
| 5,790,446 A | 8/1998 | Yu et al. | |
| 5,794,067 A | 8/1998 | Kadowaki | |
| 5,801,546 A | 9/1998 | Pierce et al. | |
| 5,805,477 A | 9/1998 | Perner | |
| 5,805,913 A | 9/1998 | Guttag et al. | |
| 5,808,926 A | 9/1998 | Gorshtein et al. | |
| 5,812,479 A | 9/1998 | Cliff et al. | |
| 5,812,562 A | 9/1998 | Baeg | |
| 5,815,422 A | 9/1998 | Dockser | |
| 5,821,776 A | 10/1998 | McGowan | |
| 5,825,202 A | 10/1998 | Tavana et al. | |
| 5,838,165 A | 11/1998 | Chatter | |
| 5,841,684 A | 11/1998 | Dockser | |
| 5,847,579 A | 12/1998 | Trimberger | |
| 5,847,978 A | 12/1998 | Ogura et al. | |
| 5,847,981 A | 12/1998 | Kelley et al. | |
| 5,859,878 A | 1/1999 | Phillips et al. | |
| 5,869,979 A | 2/1999 | Bocchino | |
| 5,872,380 A | 2/1999 | Rostoker et al. | |
| 5,874,834 A | 2/1999 | New | |
| 5,878,250 A | 3/1999 | LeBlanc | |
| 5,880,981 A | 3/1999 | Kojima et al. | |
| 5,892,962 A | 4/1999 | Cloutier | |
| 5,894,228 A | 4/1999 | Reddy et al. | |
| 5,898,602 A | 4/1999 | Rothman et al. | |
| 5,931,898 A | 8/1999 | Khoury | |
| 5,942,914 A | 8/1999 | Reddy et al. | |
| 5,944,774 A | 8/1999 | Dent | |
| 5,949,710 A | 9/1999 | Pass et al. | |
| 5,951,673 A | 9/1999 | Miyata | |
| 5,956,265 A | 9/1999 | Lewis | |
| 5,959,871 A | 9/1999 | Pierzchala et al. | |
| 5,960,193 A | 9/1999 | Guttag et al. | |
| 5,961,635 A | 10/1999 | Guttag et al. | |
| 5,963,048 A | 10/1999 | Harrison et al. | |
| 5,963,050 A | 10/1999 | Young et al. | |
| 5,968,196 A | 10/1999 | Ramamurthy et al. | |
| 5,970,254 A | 10/1999 | Cooke et al. | |
| 5,978,260 A | 11/1999 | Trimberger et al. | |
| 5,982,195 A | 11/1999 | Cliff et al. | |
| 5,986,465 A | 11/1999 | Mendel | |
| 5,991,788 A | 11/1999 | Mintzer | |
| 5,991,898 A | 11/1999 | Rajski et al. | |
| 5,995,748 A | 11/1999 | Guttag et al. | |
| 5,999,015 A | 12/1999 | Cliff et al. | |
| 5,999,990 A | 12/1999 | Sharrit et al. | |
| 6,005,806 A | 12/1999 | Madurawe et al. | |
| 6,006,321 A | 12/1999 | Abbott | |
| 6,009,451 A | 12/1999 | Burns | |
| 6,018,755 A | 1/2000 | Gonikberg et al. | |
| 6,020,759 A | 2/2000 | Heile | |
| 6,021,423 A | 2/2000 | Nag et al. | |
| 6,029,187 A | 2/2000 | Verbauwhede | |
| 6,031,763 A | 2/2000 | Sansbury | |
| 6,041,339 A | 3/2000 | Yu et al. | |
| 6,041,340 A | 3/2000 | Mintzer | |
| 6,052,327 A | 4/2000 | Reddy et al. | |
| 6,052,755 A | 4/2000 | Terrill et al. | |
| 6,052,773 A | 4/2000 | DeHon et al. | |
| 6,055,555 A | 4/2000 | Boswell et al. | |
| 6,064,614 A | 5/2000 | Khoury | |
| 6,065,131 A | 5/2000 | Andrews et al. | |
| 6,066,960 A | 5/2000 | Pedersen | |
| 6,069,487 A | 5/2000 | Lane et al. | |
| 6,072,994 A | 6/2000 | Phillips et al. | |
| 6,073,154 A | 6/2000 | Dick | |
| 6,075,381 A | 6/2000 | LaBerge | |
| 6,084,429 A | 7/2000 | Trimberger | |
| 6,085,317 A | 7/2000 | Smith | |
| 6,091,261 A | 7/2000 | DeLange | |
| 6,091,765 A | 7/2000 | Pietzold, III et al. | |
| 6,094,726 A | 7/2000 | Gonion et al. | |
| 6,097,988 A | 8/2000 | Tobias | |
| 6,098,163 A | 8/2000 | Guttag et al. | |
| 6,107,820 A | 8/2000 | Jefferson et al. | |
| 6,107,821 A | 8/2000 | Kelem et al. | |
| 6,107,824 A | 8/2000 | Reddy et al. | |

| Patent Number | Date | Inventor |
|---|---|---|
| 6,130,554 A | 10/2000 | Kolze et al. |
| 6,140,839 A | 10/2000 | Kaviani et al. |
| 6,144,980 A | 11/2000 | Oberman |
| 6,154,049 A | 11/2000 | New |
| 6,157,210 A | 12/2000 | Zaveri et al. |
| 6,163,788 A | 12/2000 | Chen et al. |
| 6,167,415 A | 12/2000 | Fischer et al. |
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,260,053 B1 | 7/2001 | Maulik et al. |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,327,605 B2 | 12/2001 | Arakawa et al. |
| 6,346,824 B1 | 2/2002 | New |
| 6,351,142 B1 | 2/2002 | Abbott |
| 6,353,843 B1 | 3/2002 | Chehrazi et al. |
| 6,359,468 B1 | 3/2002 | Park et al. |
| 6,360,240 B1 | 3/2002 | Takano et al. |
| 6,362,650 B1 | 3/2002 | New et al. |
| 6,366,944 B1 | 4/2002 | Hossain et al. |
| 6,367,003 B1 | 4/2002 | Davis |
| 6,369,610 B1 | 4/2002 | Cheung et al. |
| 6,377,970 B1 | 4/2002 | Abdallah et al. |
| 6,407,576 B1 | 6/2002 | Ngai et al. |
| 6,407,694 B1 | 6/2002 | Cox et al. |
| 6,427,157 B1 | 7/2002 | Webb |
| 6,434,587 B1 | 8/2002 | Liao et al. |
| 6,438,569 B1 | 8/2002 | Abbott |
| 6,438,570 B1 | 8/2002 | Miller |
| 6,446,107 B1 | 9/2002 | Knowles |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,487,575 B1 | 11/2002 | Oberman |
| 6,523,055 B1 | 2/2003 | Yu et al. |
| 6,523,057 B1 | 2/2003 | Savo et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,578,060 B2 | 6/2003 | Chen et al. |
| 6,591,283 B1 | 7/2003 | Conway et al. |
| 6,591,357 B2 | 7/2003 | Mirsky |
| 6,600,495 B1 | 7/2003 | Boland et al. |
| 6,600,788 B1 | 7/2003 | Dick et al. |
| 6,628,140 B2 | 9/2003 | Langhammer et al. |
| 6,687,722 B1 | 2/2004 | Larsson et al. |
| 6,692,534 B1 | 2/2004 | Wang et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,732,134 B1 | 5/2004 | Rosenberg et al. |
| 6,744,278 B1 | 6/2004 | Liu et al. |
| 6,745,254 B2 | 6/2004 | Boggs et al. |
| 6,763,367 B2 | 7/2004 | Kwon et al. |
| 6,771,094 B1 | 8/2004 | Langhammer et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,801,924 B1 | 10/2004 | Green et al. |
| 6,836,839 B2 | 12/2004 | Master et al. |
| 6,874,079 B2 | 3/2005 | Hogenauer |
| 6,889,238 B2 | 5/2005 | Johnson |
| 6,904,471 B2 | 6/2005 | Boggs et al. |
| 6,924,663 B2 | 8/2005 | Masui et al. |
| 6,963,890 B2 | 11/2005 | Dutta et al. |
| 6,971,083 B1 | 11/2005 | Farrugia et al. |
| 6,978,287 B1 | 12/2005 | Langhammer |
| 6,983,300 B2 | 1/2006 | Ferroussat |
| 7,020,673 B2 | 3/2006 | Ozawa |
| 7,024,446 B2 | 4/2006 | Langhammer et al. |
| 7,047,272 B2 | 5/2006 | Giacalone et al. |
| 7,062,526 B1 | 6/2006 | Hoyle |
| 7,093,204 B2 | 8/2006 | Oktem et al. |
| 7,107,305 B2 | 9/2006 | Deng et al. |
| 7,113,969 B1 | 9/2006 | Green et al. |
| 7,181,484 B2 | 2/2007 | Stribaek et al. |
| 7,230,451 B1 | 6/2007 | Langhammer |
| 7,313,585 B2 | 12/2007 | Winterrowd |
| 7,343,388 B1 | 3/2008 | Burney et al. |
| 7,395,298 B2 | 7/2008 | Debes et al. |
| 7,401,109 B2 | 7/2008 | Koc et al. |
| 7,409,417 B2 | 8/2008 | Lou |
| 7,415,542 B2 | 8/2008 | Hennedy et al. |
| 7,421,465 B1 | 9/2008 | Rarick et al. |
| 7,428,565 B2 | 9/2008 | Fujimori |
| 7,428,566 B2 | 9/2008 | Siu et al. |
| 7,430,578 B2 | 9/2008 | Debes et al. |
| 7,430,656 B2 | 9/2008 | Sperber et al. |
| 7,447,310 B2 | 11/2008 | Koc et al. |
| 7,472,155 B2 | 12/2008 | Simkins et al. |
| 7,508,936 B2 | 3/2009 | Eberle et al. |
| 7,536,430 B2 | 5/2009 | Guevokian et al. |
| 7,567,997 B2 | 7/2009 | Simkins et al. |
| 7,590,676 B1 | 9/2009 | Langhammer |
| 7,646,430 B2 | 1/2010 | Brown Elliott et al. |
| 7,668,896 B2 | 2/2010 | Lutz et al. |
| 7,719,446 B2 | 5/2010 | Rosenthal et al. |
| 7,720,898 B2 | 5/2010 | Driker et al. |
| 7,769,797 B2 | 8/2010 | Cho et al. |
| 7,917,567 B1 | 3/2011 | Mason et al. |
| 7,930,335 B2 | 4/2011 | Gura |
| 7,930,336 B2 | 4/2011 | Langhammer |
| 8,090,758 B1 | 1/2012 | Shimanek et al. |
| 8,112,456 B1 | 2/2012 | Van Hoff et al. |
| 2001/0023425 A1 | 9/2001 | Oberman et al. |
| 2001/0029515 A1 | 10/2001 | Mirsky |
| 2001/0037352 A1 | 11/2001 | Hong |
| 2002/0002573 A1 | 1/2002 | Landers et al. |
| 2002/0032713 A1 | 3/2002 | Jou et al. |
| 2002/0038324 A1 | 3/2002 | Page et al. |
| 2002/0049798 A1 | 4/2002 | Wang et al. |
| 2002/0078114 A1 | 6/2002 | Wang et al. |
| 2002/0089348 A1 | 7/2002 | Langhammer |
| 2002/0116434 A1 | 8/2002 | Nancekievill |
| 2003/0088757 A1 | 5/2003 | Lindner et al. |
| 2004/0064770 A1 | 4/2004 | Xin |
| 2004/0083412 A1 | 4/2004 | Corbin et al. |
| 2004/0103133 A1 | 5/2004 | Gurney |
| 2004/0122882 A1 | 6/2004 | Zakharov et al. |
| 2004/0148321 A1 | 7/2004 | Guevorkian et al. |
| 2004/0172439 A1 | 9/2004 | Lin |
| 2004/0178818 A1 | 9/2004 | Crotty et al. |
| 2004/0193981 A1 | 9/2004 | Clark et al. |
| 2004/0267857 A1 | 12/2004 | Abel et al. |
| 2004/0267863 A1 | 12/2004 | Bhushan et al. |
| 2005/0038842 A1 | 2/2005 | Stoye |
| 2005/0144212 A1 | 6/2005 | Simkins et al. |
| 2005/0144215 A1 | 6/2005 | Simkins et al. |
| 2005/0144216 A1 | 6/2005 | Simkins et al. |
| 2005/0166038 A1 | 7/2005 | Wang et al. |
| 2005/0187997 A1 | 8/2005 | Zheng et al. |
| 2005/0187999 A1 | 8/2005 | Zheng et al. |
| 2005/0262175 A1 | 11/2005 | Iino et al. |
| 2006/0020655 A1 | 1/2006 | Lin |
| 2006/0112160 A1 | 5/2006 | Ishii et al. |
| 2007/0083585 A1 | 4/2007 | St. Denis et al. |
| 2007/0185951 A1 | 8/2007 | Lee et al. |
| 2007/0185952 A1 | 8/2007 | Langhammer et al. |
| 2007/0241773 A1 | 10/2007 | Hutchings et al. |
| 2008/0133627 A1 | 6/2008 | Langhammer et al. |
| 2008/0159441 A1 | 7/2008 | Liao et al. |
| 2008/0183783 A1 | 7/2008 | Tubbs |

| | | | |
|---|---|---|---|
| 2009/0083358 | A1 | 3/2009 | Allen |
| 2009/0113186 | A1 | 4/2009 | Kato et al. |
| 2009/0172052 | A1 | 7/2009 | DeLaquil et al. |
| 2009/0187615 | A1 | 7/2009 | Abe et al. |
| 2009/0228689 | A1* | 9/2009 | Muff et al. ............. 712/219 |
| 2009/0300088 | A1 | 12/2009 | Michaels et al. |
| 2010/0098189 | A1 | 4/2010 | Oketani |
| 2010/0146022 | A1 | 6/2010 | Swartzlander et al. |
| 2010/0191939 | A1* | 7/2010 | Muff et al. ............. 712/222 |
| 2012/0166512 | A1 | 6/2012 | Wong et al. |

FOREIGN PATENT DOCUMENTS

| | | |
|---|---|---|
| EP | 0 411 491 | 2/1991 |
| EP | 0 419 105 | 3/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 721 159 | 7/1996 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 63-216131 | 8/1988 |
| JP | 4-332036 | 11/1992 |
| JP | 5-134851 | 6/1993 |
| JP | 06-187129 | 7/1994 |
| JP | 7-135447 | 5/1995 |
| JP | 11-296345 | 10/1999 |
| JP | 2000-259394 | 9/2000 |
| JP | 2002-108606 | 4/2002 |
| JP | 2002-251281 | 9/2002 |
| WO | WO95-27243 | 10/1995 |
| WO | WO96-28774 | 9/1996 |
| WO | WO97-08606 | 3/1997 |
| WO | WO98-12629 | 3/1998 |
| WO | WO98-32071 | 7/1998 |
| WO | WO98-38741 | 9/1998 |
| WO | WO99-22292 | 5/1999 |
| WO | WO99-31574 | 6/1999 |
| WO | WO99-56394 | 11/1999 |
| WO | WO00-51239 | 8/2000 |
| WO | WO00-52824 | 9/2000 |
| WO | WO01-13562 | 2/2001 |
| WO | WO 2005/066832 | 7/2005 |
| WO | WO2005-101190 | 10/2005 |

OTHER PUBLICATIONS

Xilinx Inc., "Complex Multiplier v2.0", DS291 Product Specification/Datasheet, Nov. 2004.
Martinson, L. et al., "Digital Matched Filtering with Pipelined Floating Point Fast Fourier Transforms (FFT's)," *IEEE Transactions on Acoustics, Speech, and Signal Processing*, vol. ASSP-23, No. 2, pp. 222-234, Apr. 1975.
Altera Corporation, "FIR Compiler: MegaCore® Function User Guide," version 3.3.0, rev. 1, pp. 3 11 through 3 15 (Oct. 2005).
Haynes, S.D., et al., "Configurable multiplier blocks for embedding in FPGAs," *Electronics Letters*, vol. 34, No. 7, pp. 638-639 (Apr. 2, 1998).
Kim, Y., et al., "Fast GPU Implementation for the Solution of Tridiagonal Matrix Systems," *Journal of Korean Institute of Information Scientists and Engineers*, vol. 32, No. 12, pp. 692-704, Dec. 2005.
Govindu, G. et al., "A Library of Parameterizable Floating-Point Cores for FPGAs and Their Application to Scientific Computing," *Proc Int'l Conf. Eng. Reconfigurable Systems and Algorithms (ERSA'05)*, Jun. 2005.
Govindu, G. et al., "Analysis of High-performance Floating-point Arithmetic on FPGAs," *Proceedings of the 18th International Parallel and Distributed Processing Symposium (PDPS'04)*, pp. 149-156, Apr. 2004.
Nakasato, N., et al., "Acceleration of Hydrosynamical Simulations using a FPGA board", *The Institute of Electronics Information and Communication Technical Report CPSY2005-47*, vol. 105, No. 515, Jan. 17, 2006.
Osana, Y., et al., "Hardware-resource Utilization Analysis on an FPGA-Based Biochemical Simulator ReCSiP", *The Institute of Electronics Information and Communication Technical Report CPSY2005-63*, vol. 105, No. 516, Jan. 18, 2006.
Vladimirova, T. et al., "Floating-Point Mathematical Co-Processor for a Single-Chip On-Board Computer," *MAPLD'03 Conference*, D5, Sep. 2003.
Altera Corporation, "Digital Signal Processing (DSP)," *Stratix Device Handbook*, vol. 2, Chapter 6 and Chapter 7, v1.1 (Sep. 2004).
Altera Corporation, "DSP Blocks in Stratix II and Stratix II GX Devices," *Stratix II Device Handbook*, vol. 2, Chapter 6, v4.0 (Oct. 2005).
Amos, D., "PLD architectures match DSP algorithms" *Electronic Product Design*, vol. 17, No. 7, Jul. 1996, pp. 30, 32.
Analog Devices, Inc., The Applications Engineering Staff of Analog Devices, DSP Division, *Digital Signal Processing Applications Using the ADSP-2100 Family* (edited by Amy Mar), 1990, pp. 141-192).
Andrejas, J., et al., "Reusable DSP functions in FPGAs," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 456-461.
Aoki, T., "Signed-weight arithmetic and its application to a field-programmable digital filter architecture," *IEICE Transactions on Electronics*, 1999, vol. E82C, No. 9, Sep. 1999, pp. 1687-1698.
Ashour, M.A., et al., "An FPGA implementation guide for some different types of serial-parallel multiplier-structures," *Microelectronics Journal*, vol. 31, No. 3, 2000, pp. 161-168.
Berg, B.L., et al."Designing Power and Area Efficient Multistage FIR Decimators with Economical Low Order Filters," *ChipCenter Technical Note*, Dec. 2001.
Bursky, D., "Programmable Logic Challenges Traditional ASIC SoC Designs", *Electronic Design*, Apr. 15, 2002.
Chhabra, A. et al., Texas Instruments Inc., "A Block Floating Point Implementation on the TMS320C54x DSP", Application Report SPRA610, Dec. 1999, pp. 1-10.
Colet, p., "When DSPs and FPGAs meet: Optimizing image processing architectures," *Advanced Imaging*, vol. 12, No. 9, Sep. 1997, pp. 14, 16, 18.
Crookes, D., et al., "Design and implementation of a high level programming environment for FPGA-based image processing," *IEE Proceedings-Vision, Image and Signal Processing*, vol. 147, No. 4, Aug. 2000, pp. 377-384.
Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286.
Dick, C., et al., "Configurable logic for digital communications: some signal processing perspectives," *IEEE Communications Magazine*, vol. 37, No. 8, Aug. 1999, pp. 107-111.
Do, T.-T., et al., "A flexible implementation of high-performance FIR filters on Xilinx FPGAs," *Field-Programmable Logic and Applications: From FPGAs to Computing Paradigm. 8th International Workshop, FPL'98. Proceedings*, Hartenstein, R.W., et al., eds., Aug. 31-Sep. 3, 1998, pp. 441-445.
Gaffer, A.A., et al., "Floating-Point Bitwidth Analysis via Automatic Differentiation," *IEEE Conference on Field Programmable Technology*, Hong Kong, Dec. 2002.
Guccione, S.A.,"Run-time Reconfiguration at Xilinx," *Parallel and distributed processing: 15 IPDPS 2000 workshops*, Rolim, J., ed., May 1-5, 2000, p. 873.
Hauck, S., "The Future of Reconfigurable Systems," *Keynote Address, 5th Canadian Conference on Field Programmable Devices*, Jun. 1998, http:--www.ee.washington.edu-people-faculty-hauck-publications-ReconfigFuture.PDF.

Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science* vol. 1896), Aug. 27-30, 2000, pp. 400-411.

Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.

Lattice Semiconductor Corp, *ORCA® FPGA Express™ Interface Manual: ispLEVER® Version 3.0*, 2002.

Lucent Technologies, Microelectronics Group, "Implementing and Optimizing Multipliers in ORCA™ FPGAs,", Application Note. AP97-008FGPA, Feb. 1997.

"Implementing Multipliers in FLEX 10K EABs", *Altera*, Mar. 1996.

"Implementing Logic with the Embedded Array in FLEX 10K Devices", *Altera*, May 2001, ver. 2.1.

Jinghua Li, "Design a pocket multi-bit multiplier in FPGA," *1996 2nd International Conference on ASIC Proceedings* (IEEE Cat. No. 96TH8140) Oct. 21-24, 1996, pp. 275-279.

Jones, G., "Field-programmable digital signal conditioning," *Electronic Product Design*, vol. 21, No. 6, Jun. 2000, pp. C36-C38.

Kiefer, R., et al., "Performance comparison of software-FPGA hardware partitions for a DSP application," *14th Australian Microelectronics Conference. Microelectronics: Technology Today for the Future. MICRO '97 Proceedings*, Sep. 28-Oct. 1, 1997, pp. 88-93.

Kramberger, I., "DSP acceleration using a reconfigurable FPGA," *ISIE '99. Proceedings of the IEEE International Symposium on Industrial Electronics* (Cat. No. 99TH8465), vol. 3, Jul. 12-16, 1999, pp. 1522-1525.

Langhammer, M., "How to implement DSP in programmable logic," *Elettronica Oggi*, No. 266, Dec. 1998, pp. 113-115.

Langhammer, M., "Implementing a DSP in Programmable Logic," *Online EE Times*, May 1998, http:--www.eetimes.com-editorial-1998-coverstory9805.html.

Lazaravich, B.V., "Function block oriented field programmable logic arrays," *Motorola, Inc. Technical Developments*, vol. 18, Mar. 1993, pp. 10-11.

Lund, D., et al., "A new development system for reconfigurable digital signal processing," First International Conference on 3G Mobile Communication Technologies (Conf. Publ. No. 471), Mar. 27-29, 2000, pp. 306-310.

Miller, N.L., et al., "Reconfigurable integrated circuit for high performance computer arithmetic," *Proceedings of the 1998 IEE Colloquium on Evolvable Hardware Systems (Digest)*, No. 233, 1998, pp. 2-1-2-4.

Mintzer, L., "Xilinx FPGA as an FFT processor," *Electronic Engineering*, vol. 69, No. 845, May 1997, pp. 81, 82, 84.

Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nozal, L., et al., "A new vision system: programmable logic devices and digital signal processor architecture (PLD+DSP)," *Proceedings IECON '91. 1991 International Conference on Industrial Electronics, Control and Instrumentation* (Cat. No. 91CH2976-9) vol. 3, Oct. 28-Nov. 1, 1991, pp. 2014-2018.

Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.

Parhami, B., "Configurable arithmetic arrays with data-driven control," *34th Asilomar Conference on Signals, Systems and Computers*, vol. 1, 2000, pp. 89-93.

"The QuickDSP Design Guide", Quicklogic, Aug. 2001, revision B.

"QuickDSP™ Family Data Sheet", *Quicklogic*, Aug. 7, 2001, revision B.

Rangasayee, K., "Complex PLDs let you produce efficient arithmetic designs," *EDN (European Edition)*, vol. 41, No. 13, Jun. 20, 1996, pp. 109, 110, 112, 114, 116.

Rosado, A., et al., "A high-speed multiplier coprocessor unit based on FPGA," *Journal of Electrical Engineering*, vol. 48, No. 11-12, 1997, pp. 298-302.

Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303), Jul. 26-28, 1999, pp. 147-150.

Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.

Tisserand, A., et al., "An on-line arithmetic based FPGA for low power custom computing," *Field Programmable Logic and Applications, 9th International Workshop, FPL'99, Proceedings (Lecture Notes in Computer Science* vol. 1673), Lysaght, P., et al., eds., Aug. 30-Sep. 1, 1999, pp. 264-273.

Tralka, C., "Symbiosis of DSP and PLD," *Elektronik*, vol. 49, No. 14, Jul. 11, 2000, pp. 84-96.

Underwood, K. "FPGAs vs. CPUs: Trends in Peak Floating-Point Performance," *Proceedings of the 2004 ACM-SIGDA 12th International Symposium on Field Programmable Gate Arrays*, pp. 171-180, Feb. 22-24, 2004.

Valls, J., et al., "A Study About FPGA-Based Digital Filters," *Signal Processing Systems, 1998*, SIPS 98, 1998 IEEE Workshop, Oct. 10, 1998, pp. 192-201.

"Virtex-II 1.5V Field-Programmable Gate Arrays", *Xilinx*, Jan. 25, 2001, module 2 of 4.

"Virtex-II 1.5V Field-Programmable Gate Arrays", *Xilinx*, Apr. 2, 2001, module 1 of 4.

"Virtex-II 1.5V Field-Programmable Gate Arrays", *Xilinx*, Apr. 2, 2001, module 2 of 4.

Walters, A.L., "A Scaleable FIR Filter Implementation Using 32-bit Floating-Point Complex Arithmetic on, a FPGA Based Custom Computing Platform," Allison L. Walters, Thesis Submitted to the Faculty of Virginia Polytechnic Institute and State University, Jan. 30, 1998.

Weisstein, E.W., "Karatsuba Multiplication," *MathWorld—A Wolfram Web Resource* (Dec. 9, 2007), accessed Dec. 11, 2007 at http:--mathworld.wolfram.com-KaratsubaMultiplication.html.

Wenzel, L., "Field programmable gate arrays (FPGAs) to replace digital signal processor integrated circuits," *Elektronik*, vol. 49, No. 5, Mar. 7, 2000, pp. 78-86.

"Xilinx Unveils New FPGA Architecture to Enable High-Performance, 10 Million System Gate Designs", *Xilinx*, Jun. 22, 2000.

"Xilinx Announces DSP Algorithms, Tools and Features for Virtex-II Architecture", *Xilinx*, Nov. 21, 2000.

Xilinx Inc., "Virtex-II 1.5V Field-Programmable Gate Arrays", Advance Product Specification, DS031-2 (v1.9), Nov. 29, 2001, Module 2 of 4, pp. 1-39.

Xilinx Inc., "Using Embedded Multipliers", Virtex-II Platform FPGA Handbook, UG002 (v1.3), Dec. 3, 2001, pp. 251-257.

Xilinx, Inc., "A 1D Systolic FIR," copyright 1994-2002, downloaded from http:--www.iro.umontreal.ca-~aboulham-F6221-Xilinx%20A%201D%20systolic%20FIR.htm.

Xilinx, Inc., "The Future of FPGA's," White Paper, available Nov. 14, 2005 for download from http:--www.xilinx.com-prs_rls,5yrwhite.htm.

Xilinx Inc., "XtremeDSP Design Considerations User Guide," v 1.2, Feb. 4, 2005.

Altera Corporation, "Advanced Synthesis Cookbook: A Design Guide for Stratix II, Stratix III and Stratix IV Devices," Document Version 3.0, 112 pgs., May 2008.

deDinechin, F. et al., "Large multipliers with less DSP blocks," retrieved from http://hal-ens-lyon.archives-ouvertes.fr/ensl-00356421/en/, 9 pgs., available online Jan. 2009.

Wajih, E.-H.Y. et al., "Efficient Hardware Architecture of Recursive Karatsuba-Ofman Multiplier," *3rd International Conference on Design and Technology of Integrated Systems in Nanoscale Era*, 6 pgs, Mar. 2008.

Zhou, G. et al., "Efficient and High-Throughput Implementations of AES-GCM on FPGAs," *International Conference on Field-Programmable Technology*, 8 pgs., Dec. 2007.

Altera Corp., "DSP Blocks in Stratix III Devices," *Stratix III Device Handbook*, vol. 1, Chapter 5, pp. 1-42, Mar. 2010.

Karlström, P., et al., "High Performance, Low Latency FPGA based Floating Point Adder and Multiplier Units in a Virtex 4," Norchip Conf., pp. 31-34, 2006.

Thapliyal, H., et al., "Combined Integer and Floating Point Multiplication Architecture (CIFM) for FPGSs and Its Reversible Logic Implementation", *Proceedings MWSCAS 2006*, Puerto Rico, 5 pages, Aug. 2006.

Thapliyal, H., et al., "Combined Integer and Variable Precision (CIVP) Floating Point Multiplication Architecture for FPGAs", *Proceedings of the 2007 International Conference on Parallel and Distributed Processing Techniques and Applications (PDPTA'07)*, Las Vegas, US, vol. 1, pp. 449-450, Jun. 2007.

Xilinx, Inc., *Virtex-5 ExtremeDSP Design Considerations User Guide UG193*, v2.6, 114 pages, Oct. 2007.

Xilinx, Inc., "Implementing Barrel Shifters Using Multipliers," p. 1-4, Aug. 17, 2004.

\* cited by examiner

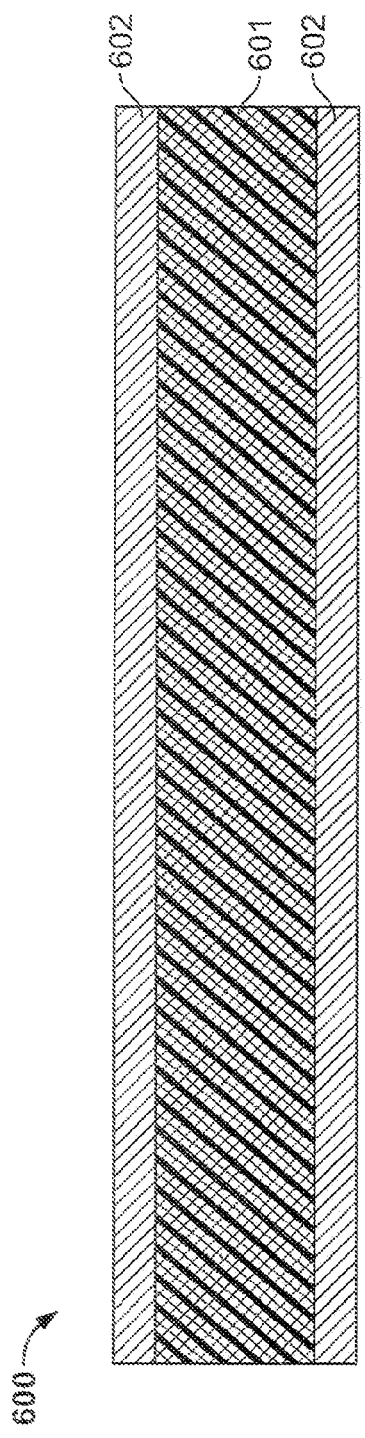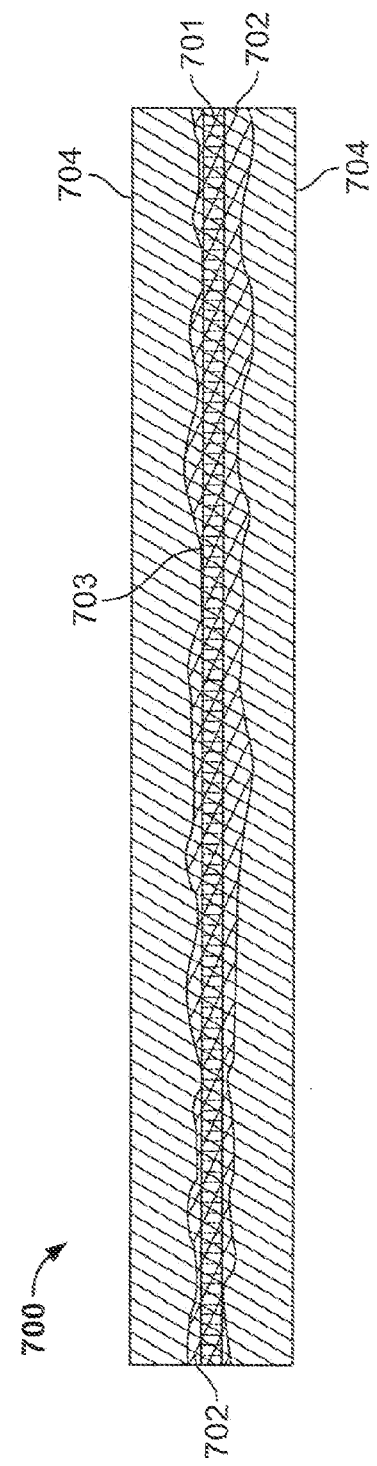
FIG. 5
FIG. 6

US 8,412,756 B1

MULTI-OPERAND FLOATING POINT OPERATIONS IN A PROGRAMMABLE INTEGRATED CIRCUIT DEVICE

BACKGROUND OF THE INVENTION

This invention relates to performing floating point arithmetic operations in programmable integrated circuit devices, such as programmable logic devices (PLDs).

As applications for which programmable devices are used increase in complexity, it has become more common to design programmable devices to include specialized processing blocks in addition to blocks of generic programmable logic resources. Such specialized processing blocks may include a concentration of circuitry on a programmable device that has been partly or fully hardwired to perform one or more specific tasks, such as a logical or a mathematical operation. A specialized processing block may also contain one or more specialized structures, such as an array of configurable memory elements. Examples of structures that are commonly implemented in such specialized processing blocks include: multipliers, arithmetic logic units (ALUs), barrel-shifters, various memory elements (such as FIFO/LIFO/SIPO/RAM/ROM/CAM blocks and register files), AND/NAND/OR/NOR arrays, etc., or combinations thereof.

One particularly useful type of specialized processing block that has been provided on programmable devices is a digital signal processing (DSP) block, which may be used to process, e.g., audio signals. Such blocks are frequently also referred to as multiply-accumulate ("MAC") blocks, because they include structures to perform multiplication operations, and sums and/or accumulations of multiplication operations.

For example, PLDs sold by Altera Corporation, of San Jose, Calif., under the family name STRATIX® include DSP blocks, each of which includes a plurality of multipliers (e.g., 18-by-18 multipliers). Each of those DSP blocks also includes adders and registers, as well as programmable connectors (e.g., multiplexers) that allow the various components to be configured in different ways. In each such block, the multipliers can be configured not only as individual multipliers, but also as smaller multipliers (by leaving some inputs unused or zeroed), or as one larger multiplier. In addition, complex multiplication (which decomposes into two multiplication operations for each of the real and imaginary parts) can be performed.

The arithmetic operations to be performed by a PLD frequently are floating point operations. The IEEE754-1985 standard requires that in floating point operations, values be normalized at all times because it implies a leading "1".

SUMMARY OF THE INVENTION

The present invention relates to circuitry that carries out floating point operations on multiple operands without normalization, although the results may be normalized if IEEE754-1985 compliance is required. In addition, normalization may be performed in intermediate steps if loss of data might otherwise result. The circuitry can be provided in a fixed logic device, or can be configured into a programmable integrated circuit device such as a programmable logic device (PLD).

In accordance with the present invention, there is provided a method of configuring a programmable integrated circuit device to perform floating point addition operations on a plurality of numbers, where each of the numbers is represented by a respective mantissa and a respective exponent. The method includes configuring logic of the programmable integrated circuit device to determine a largest exponent of the respective exponent of the plurality of numbers, and to subtract each respective exponent from the largest exponent to determine a respective shifting amount, and to select the largest exponent as a resultant exponent. Logic of the programmable integrated circuit device also is configured to shift each respective mantissa of the plurality of numbers by the respective shifting amount. A compressor is configured in the programmable integrated circuit device to simultaneously combine the plurality of shifted mantissas into a carry vector and a save vector. A carry-propagate adder is configured in the programmable integrated circuit device to combine the carry vector and the save vector.

A programmable logic device so configured, a machine-readable data storage medium encoded with software for performing the method, and logic circuitry to perform floating point addition operations on a plurality of numbers, are also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 5 is a cross-sectional view of a magnetic data storage medium encoded with a set of machine-executable instructions for performing the method according to the present invention;

FIG. 6 is a cross-sectional view of an optically readable data storage medium encoded with a set of machine-executable instructions for performing the method according to the present invention.

DETAILED DESCRIPTION OF THE INVENTION

Figure 1:
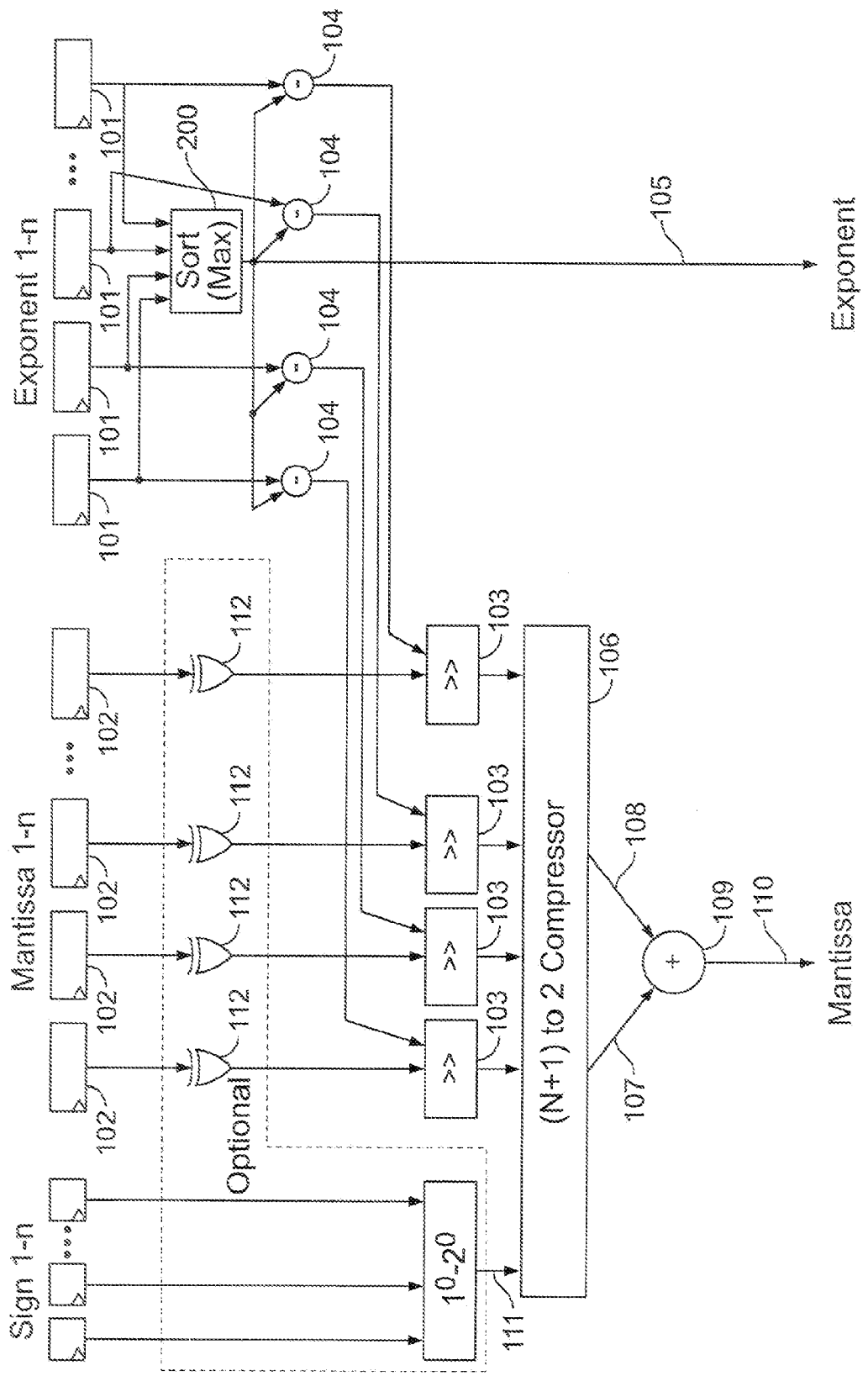
FIG. 1 shows logical architecture for an embodiment of a multi-input floating point adder according to the present invention.

Floating point numbers are commonplace for representing real numbers in scientific notation in computing systems. Examples of real numbers in scientific notation are:

$3.14159265_{10} \times 10^0$ ($\pi$)

$2.718281828_{10} \times 10^0$ (e)

$0.000000001_{10}$ or $1.0_{10} \times 10^{-9}$ (seconds in a nanosecond)

$3155760000_{10}$ or $3.15576_{10} \times 10^9$ (seconds in a century)

The first two examples are real numbers in the range of the lower integers, the third example represents a very small fraction, and the fourth example represents a very large integer. Floating point numbers in computing systems are designed to cover the large numeric range and diverse precision requirements shown in these examples. Fixed point number systems have a very limited window of representation which prevents them from representing very large or very small numbers simultaneously. The position of the notional binary-point in fixed point numbers addresses this numeric range problem to a certain extent but does so at the expense of precision. With a floating point number the window of representation can move, which allows the appropriate amount of precision for the scale of the number.

Floating point representation is generally preferred over fixed point representation in computing systems because it permits an ideal balance of numeric range and precision. However, floating point representation requires more complex implementation compared to fixed point representation.

The IEEE754-1985 standard is commonly used for floating point numbers. A floating point number includes three different parts: the sign of the number, its mantissa and its exponent. Each of these parts may be represented by a binary number and, in the IEEE754-1985 format, have the following bit sizes:

|  | Sign | Exponent | Bias | Mantissa |
|---|---|---|---|---|
| Single Precision 32-Bit | 1 bit [31] | 8 bits [30 . . . 23] | −127 | 23 bits [22 . . . 00] |
| Double Precision 64-Bit | 1 bit [63] | 11 bits [62 . . . 52] | −1023 | 52 bits [51 . . . 0] |

The exponent preferably is an unsigned binary number which, for the single precision format, ranges from 0 to 255. In order to represent a very small number, it is necessary to use negative exponents. To achieve this the exponent preferably has a negative bias associated with it. For single-precision numbers, the bias preferably is −127. For example a value of 140 for the exponent actually represents (140−127)= 13, and a value of 100 represents (100−127)=−27. For double precision numbers, the exponent bias preferably is −1023.

As discussed above, according to the standard, the mantissa is a normalized number—i.e., it has no leading zeroes and represents the precision component of a floating point number. Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision. Therefore, in single precision format, the mantissa typically includes 24 bits of precision.

However, the IEEE754-1985 standard requires continuous normalization—i.e., normalization after every step of a multistep computation—to maintain the leading "1" to preserve accuracy. This is expensive in terms of programmable resources, as each normalization operation requires two steps—(1) finding the position of the "1", and (2) shifting the fractional part to get a leading "1" (which is then eliminated, because it is implied).

In accordance with copending, commonly-assigned U.S. patent application Ser. No. 11/625,655, filed Jan. 22, 2007, which is hereby incorporated by reference herein in its entirety, there is no implied leading "1", so that normalization is not required. Although this requires that one bit of precision be given up, because all bits must be kept, rather than implied, this greatly reduces the required logic, particularly shifting logic, and therefore the latency of the floating point operations. Moreover, in a programmable device that already has dedicated arithmetic circuits, such as multipliers and/or adders, that are capable of handling the extra bits, there is no additional cost in terms of logic resources to handle those extra bits.

Specifically, according to above-incorporated application Ser. No. 11/625,655, to configure a programmable device to perform floating point operations, the programmable device preferably is configured so that floating point values in accordance with a first format, such as the IEEE754-1985 standard format, preferably are converted to an internal format for calculation purposes, and are reconverted to the standard format upon completion of the operations.

Whereas the IEEE754-1985 standard format includes a 24-bit unsigned mantissa (23 bits plus the implied "1") and an 8-bit exponent, the internal format preferably includes a 32-bit signed mantissa and a 10-bit exponent. When converting from the standard 24-bit format to the 32-bit format of the invention, the implied leading "1" of the mantissa is made explicit and preferably is initially positioned at the 28th bit location. This leaves the four most significant bits of the 32-bit number available for overflows as operations progress. For example, 16 additions could be performed before any overflow would consume all four bits. Similarly, because the original standard representation is only 24 bits wide, the four least significant bits also are available for any underflows that may occur.

As stated above, preferably, and ordinarily, during floating point operations the operands remain in the internal format, and are converted back to their original format only upon completion of operations. Because of the initial presence of the leading and trailing bits, as well as the larger exponent size, during operations it is possible to continue beyond conditions that might have led to overflows or underflows in the original format, because of the possibility that the accumulation of further results may reverse the overflow or underflow condition.

However, if during operation the accumulation of underflows or overflows reaches the point that information may be lost—e.g., there would be an overflow if the data were converted back to the standard format, or an underflow would be approached such that fewer than three significant bits beyond the required mantissa precision (i.e., in this example, fewer than 1+23+3=27 bits) would remain—it may be desirable to normalize the data at an intermediate step to prevent lost of precision. In such a case, subsequent operations preferably would not include further normalization until the final result is achieved (unless a condition again arises in which data may be lost).

Although the arrangement described in above-incorporated application Ser. No. 11/625,655 achieves savings in device area, as well as number of operations performed, it nevertheless operates on only two operands at a time. For example, to add four numbers a, b, c, d, together, a and b might be added in one operation, with c and d being added in a separate operation, and then the two intermediate sums are added. To add eight numbers, the tree would have a third level, with four individual additions of two addends each in the first level, two additions of two addends each in the second level, and a final addition of two addends in the third level. This is expensive in terms of both resources and latency.

Therefore, in accordance with the present invention, a plurality N of unnormalized numbers can be added at once, as shown in FIG. 1. Because the inputs are not normalized, they could all have different exponents. The largest exponent of the N exponents 101 is found by module 200 as described in connection with FIG. 2, and for each of the inputs, its mantissa 102 is right-shifted by one of shifters 103 by the difference 104 between the largest exponent 105 and the exponent 101 of that particular input (note that this holds even for the input with the largest exponent, except that the shift will be zero bits). The N shifted mantissas are combined, optionally with sign data, in an (N+1):2 compressor 106 to provide carry and save vectors 107, 108 which may be added in a carry-propagate adder 109 to provide output mantissa 110.

The (N+1)th input 111 to compressor 106 represents the sign. If the addends are being represented in IEEE754-1985 format (except for not being normalized), then each will have a separate sign bit. In that case, the (N+1)th input 111 is a number representing how many of the inputs have a sign bit indicating a negative number. This may be thought of as a unary (1°) to binary (2°) conversion, but also may be considered to be a "count-leading-ones" module. In addition, each of the mantissas would be XORed at 112 with its sign bit to create a one's-complement equivalent representation. If any subtractions are involved, then the sign bit associated with any minuend is inverted before the unary-to-binary conversion and before the one's-complement conversion.

If signed numbers (where the most significant bit indicates the sign) are used instead of unsigned numbers with separate sign bits, and all of the operations are additions, then the mantissas are used directly, and the (N+1)th input 111, as well as XOR-gates 112, can be omitted. If some of the operations may be subtractions, the signed number inputs 111, 112 would be used but would be determined by the subtraction controls. But if the presence of subtractions is fixed for a particular user logic design, then the necessary inversions can be fixed when the user logic design is compiled, and inputs 111, 112 again could be omitted.

Figure 2:
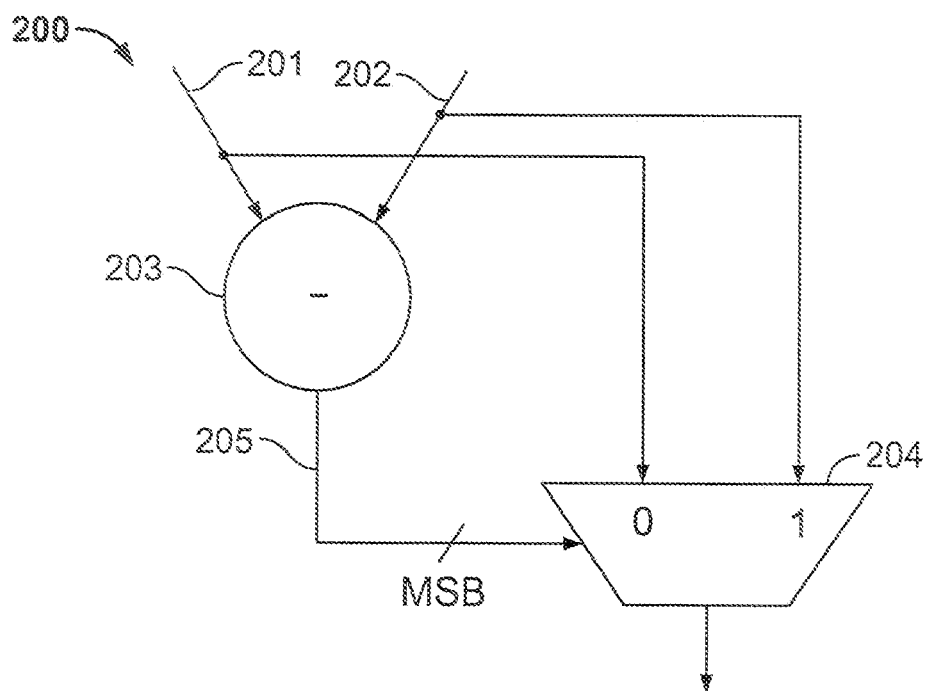
FIG. 2 is a schematic representation of a portion of binary sort logic used in an embodiment of the invention.

One embodiment of exponent sorting module 200 may use a binary sorting tree to find the largest exponent. The exponents 101 may be paired off arbitrarily. For each pair, the larger of the two exponents 201, 202 may be found as shown in FIG. 2. As seen there, exponents 201, 202 are input as signed numbers to subtractor 203, as well as to the 0th and 1th inputs, respectively, of multiplexer 204. Exponent 202 is subtracted from exponent 201. The most significant bit (MSB) of the difference 205 controls multiplexer 204. Thus, if exponent 201 is larger, difference 205 is positive, so its MSB is a 0 and multiplexer 204 selects exponent 201. If exponent 202 is larger, difference 205 is negative, so its MSB is a 1 and multiplexer 204 selects exponent 202. The results are passed to the next level of tree 200. If any level has an odd number of inputs, one input simply gets a bye to the following level. The number of levels required to sort N exponents 101 is ceil(log 2(N)).

As compared to a tree of carry-propagate adders, the structure 100 of FIG. 1 is about the same size, in terms of device area. Although compressor 106 may be larger than the equivalent number of adders, the absence of pipeline registers between adder levels makes the difference negligible. However, even though it does not present an advantage in device area, structure 100 presents a latency advantage. For example, in the case of eight inputs, the latency would be about one-half of the latency using the technique of above-incorporated application Ser. No. 11/625,655.

Normalization may be required at the end of a calculation, if an IEEE754-1985-compliant output is required. In addition, if data will be lost because an overflow or underflow will occur, then intermediate normalization may take place. Whether at the end of the calculation, or at an intermediate step, normalization may be performed, for example, by circuitry 300 such as that shown in FIG. 3.

The absolute value of denormalized mantissa 301 is determined at 302. A count-leading-zeroes module 303 may determine, by counting leading zeroes, how many bits of shifting are required to renormalize output 301. The number so determined may be used in left shifter 305 to adjust pipelined mantissa 301 and at subtractor 306 to adjust pipelined exponent 304. The normalized mantissa 310 and exponent 311 are adjusted as necessary by rounding stage 307 as is well known (e.g., from the IEEE754-1985 specification), to provide a resultant mantissa 320 and a resultant exponent 321.

Figure 4:
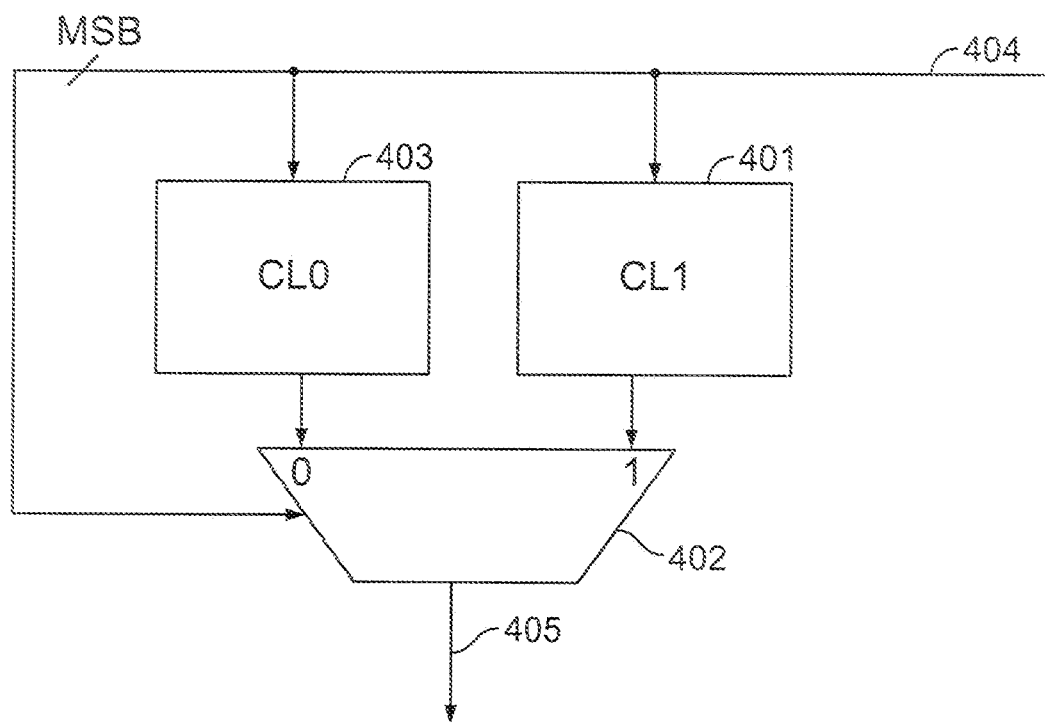
FIG. 4 is a schematic representation of an alternate arrangement of a portion of the normalization operation represented by FIG. 3.
Figure 3:
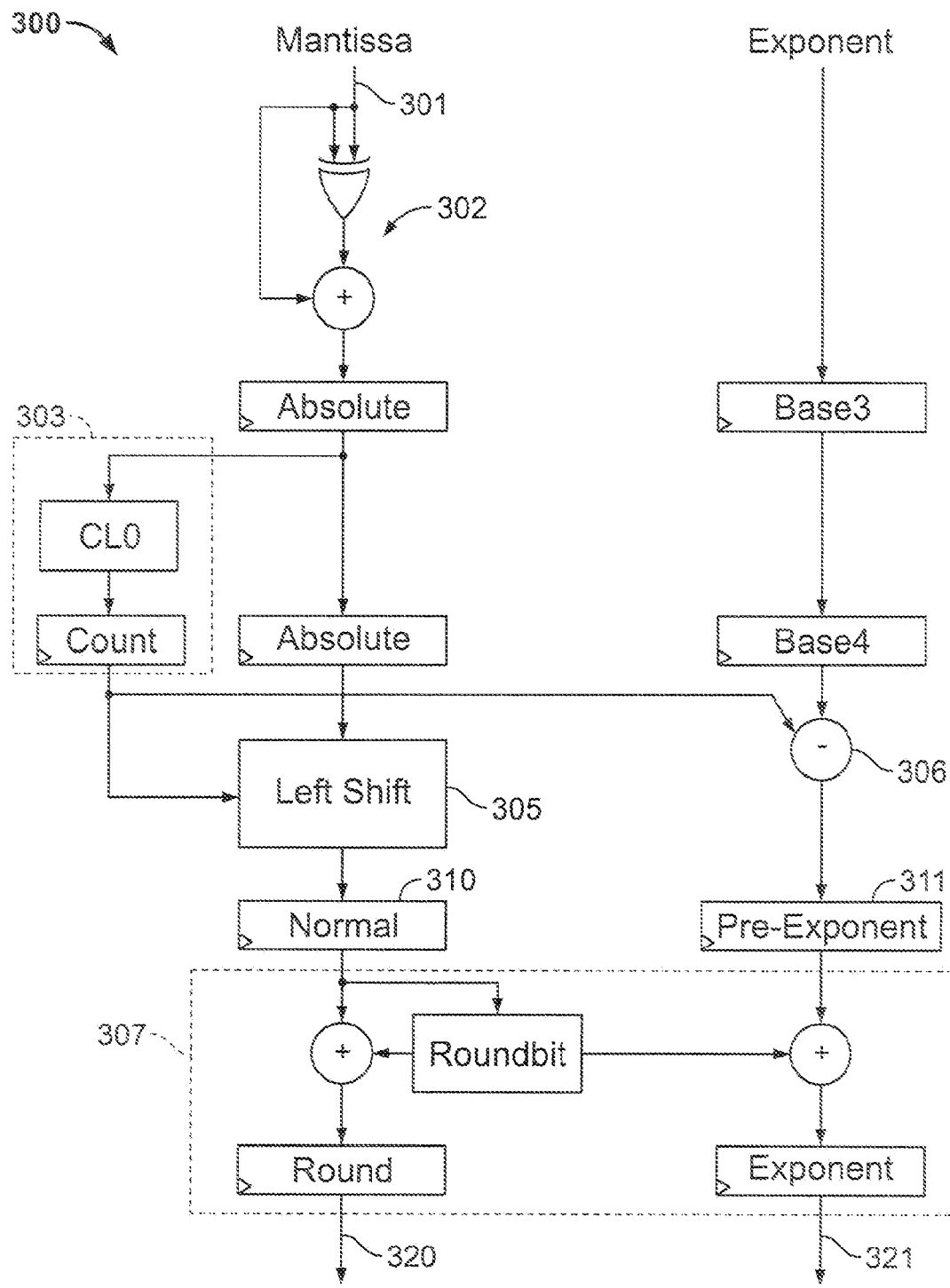
FIG. 3 is a schematic representation of normalization as performed in accordance with an embodiment of the invention.

If signed numbers are being used, then for normalization, arrangement 400 of FIG. 4 may be substituted in FIG. 3 for count-leading-zeroes module 303. Arrangement 400 includes a count-leading-zeroes module 403, as well as a count-leading-ones module 401. If a number is positive, then it will have some number of leading zeroes, the first of which is the sign bit. Count-leading-zeroes module 403 will determine how many leading zeroes there are, and that number, output at 405, will be used in left shifter 305 to normalize the number. If a number is negative, then it will have some number of leading ones, the first of which is the sign bit. Count-leading-ones module 401 will determine how many leading ones there are, and that number, output at 405, will be used in left shifter 305 to normalize the number. Whether the output of count-leading-ones module 401 or count-leading-zeroes module 403 is used is determined by a multiplexer 402 whose control input is the most significant bit of the input number 404. Whichever of count-leading-ones module 401 or count-leading-zeroes module 403 is not selected by multiplexer 402 may have a completely erroneous output, but it will be ignored.

One potential use for the present invention may be in programmable integrated circuit devices such as programmable logic devices, where programming software can be provided to allow users to configure a programmable device to perform multi-input floating point addition and subtraction (subtraction is the same as addition, with an adjustment the sign of the minuend). The result would be that fewer logic resources of the programmable device would be consumed. And where the programmable device is provided with a certain number of dedicated blocks for arithmetic functions (to spare the user from having to configure arithmetic functions from general-purpose logic), the number of dedicated blocks needed to be provided (which may be provided at the expense of additional general-purpose logic) can be reduced (or sufficient dedicated blocks for more operations, without further reducing the amount of general-purpose logic, can be provided).

Instructions for carrying out the method according to this invention may be encoded on a machine-readable medium, to be executed by a suitable computer or similar device to implement the method of the invention for programming or configuring PLDs to perform arithmetic operations in accordance with the format describe above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

FIG. 5 presents a cross section of a magnetic data storage medium 600 which can be encoded with a machine-executable program that can be carried out by systems such as the aforementioned personal computer, or other computer or similar device. Medium 600 can be a floppy diskette or hard disk, or magnetic tape, having a suitable substrate 601, which may be conventional, and a suitable coating 602, which may be conventional, on one or both sides, containing magnetic domains (not visible) whose polarity or orientation can be altered magnetically. Except in the case where it is magnetic tape, medium 600 may also have an opening (not shown) for receiving the spindle of a disk drive or other data storage device.

The magnetic domains of coating 602 of medium 600 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

FIG. 6 shows a cross section of an optically-readable data storage medium 700 which also can be encoded with such a machine-executable program, which can be carried out by systems such as the aforementioned personal computer, or other computer or similar device. Medium 700 can be a conventional compact disk read only memory (CD-ROM) or digital video disk read only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 700 preferably has a suitable substrate 701, which may be conventional, and a suitable coating 702, which may be conventional, usually on one or both sides of substrate 701.

In the case of a CD-based or DVD-based medium, as is well known, coating 702 is reflective and is impressed with a plurality of pits 703, arranged on one or more layers, to encode the machine-executable program. The arrangement of pits is read by reflecting laser light off the surface of coating 702. A protective coating 704, which preferably is substantially transparent, is provided on top of coating 702.

In the case of magneto-optical disk, as is well known, coating 702 has no pits 703, but has a plurality of magnetic domains whose polarity or orientation can be changed magnetically when heated above a certain temperature, as by a laser (not shown). The orientation of the domains can be read by measuring the polarization of laser light reflected from coating 702. The arrangement of the domains encodes the program as described above.

Thus it is seen that a method for carrying out floating point operations, a PLD programmed to perform the method, and software for carrying out the programming, have been provided.

Figure 7:
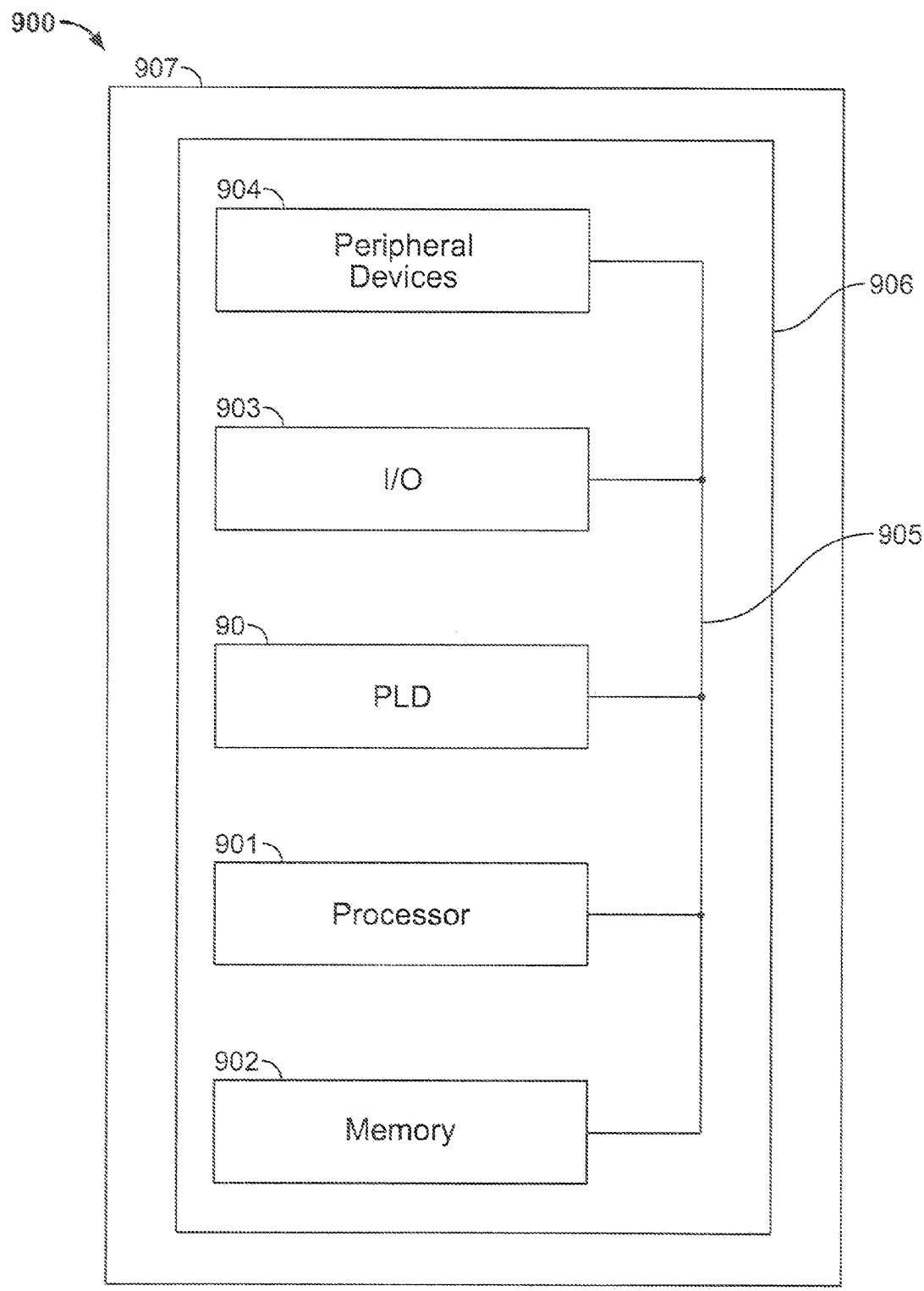
FIG. 7 is a simplified block diagram of an illustrative system employing a programmable logic device incorporating the present invention.

A PLD 90 programmed according to the present invention may be used in many kinds of electronic devices. One possible use is in a data processing system 900 shown in FIG. 7. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A method of configuring a programmable integrated circuit device to perform floating point addition operations on more than two numbers, each of said numbers being represented by a respective mantissa and a respective exponent, said method comprising:

configuring logic of said programmable integrated circuit device to determine a largest exponent of said respective exponent of said more than two numbers, and to subtract each respective said exponent from said largest exponent to determine a respective shifting amount, and to select said largest exponent as a resultant exponent;

configuring logic of said programmable integrated circuit device to shift each respective mantissa of said more than two numbers by said respective shifting amount;

configuring a compressor in said programmable integrated circuit device to simultaneously combine said more than two shifted mantissas into a carry vector and a save vector; and configuring a carry-propagate adder in said programmable integrated circuit device to combine said carry vector and said save vector.

2. The method of claim 1 wherein:

said configuring logic of said programmable integrated circuit device to determine a largest exponent comprises configuring logic of said programmable integrated circuit device to perform a binary sort.

3. The method of claim 1 further comprising:

configuring logic of said programmable integrated circuit device to normalize said resultant mantissa by a left-shift amount and to reduce said resultant exponent by said left-shift amount.

4. The method of claim 3 wherein:

configuring logic of said programmable integrated circuit device to normalize said resultant mantissa by a left-shift amount and to reduce said resultant exponent by said left-shift amount comprises configuring logic of said programmable integrated circuit device to determine said left-shift amount by counting leading zeroes in said resultant mantissa when said resultant mantissa represents an unsigned number or a positive signed number, and by counting leading ones in said resultant mantissa when said resultant mantissa represents a negative signed number.

5. The method of claim 3 further comprising configuring logic of said programmable integrated circuit device to round said normalized resultant mantissa and said reduced resultant exponent to produce a final mantissa and a final exponent.

6. The method of claim 1 wherein:

said floating-point addition operations include one or both of negative addends and subtraction operations; and said numbers are unsigned numbers having mantissas and separate sign bits; said method further comprising:

configuring logic of said programmable integrated circuit device to count each of said numbers having a sign bit equal to 1, representing a negative addend or a subtraction, for input to said compressor;

configuring logic of said programmable integrated circuit device to invert said mantissas of any negative addend, and any minuend in any subtraction operation, for input to said compressor.

7. The method of claim 1 wherein:
said floating-point addition operations include one or both of negative addends and subtraction operations; and
said numbers are signed numbers having sign bits as part of their mantissas; said method further comprising:
configuring logic of said programmable integrated circuit device to count subtraction control bits associated with said numbers for input to said compressor.

8. A programmable integrated circuit device configurable to perform floating point addition operations on more than two numbers, each of said numbers being represented by a respective mantissa and a respective exponent, said programmable integrated circuit device comprising:
programmable logic configurable to determine a largest exponent of said respective exponent of said more than two numbers, and to subtract each respective said exponent from said largest exponent to determine a respective shifting amount, and to select said largest exponent as a resultant exponent;
programmable logic configurable to shift each respective mantissa of said plurality of numbers by said respective shifting amount;
programmable logic configurable as a compressor to simultaneously combine said plurality of shifted mantissas into a carry vector and a save vector; and
programmable logic configurable to combine said carry vector and said save vector.

9. The device of claim 8 wherein said programmable logic configurable to combine said carry vector and said save vector comprises a fixed carry-propagate adder.

10. The device of claim 8 wherein said programmable logic configurable to combine said carry vector and said save vector comprises logic configurable as a carry-propagate adder.

11. The device of claim 8 wherein said programmable logic configurable to determine a largest exponent comprises programmable logic configurable to perform a binary sort.

12. The device of claim 8 further comprising programmable logic configurable to normalize said resultant mantissa by a left-shift amount and to reduce said resultant exponent by said left-shift amount.

13. The device of claim 12 wherein said logic configurable to normalize said resultant mantissa by a left-shift amount and to reduce said resultant exponent by said left-shift amount comprises logic configurable to determine said left-shift amount by counting leading zeroes in said resultant mantissa when said resultant mantissa represents an unsigned number or a positive signed number, and by counting leading ones in said resultant mantissa when said resultant mantissa represents a negative signed number.

14. The device of claim 12 further comprising logic configurable to round said normalized resultant mantissa and said reduced resultant exponent to produce a final mantissa and a final exponent.

15. The device of claim 8 wherein:
said floating-point addition operations include one or both of negative addends and subtraction operations; and
said numbers are unsigned numbers having mantissas and separate sign bits; said device further comprising:
logic configured to count each of said numbers having a sign bit equal to 1, representing a negative addend or a subtraction, for input to said compressor;
logic configured to invert said mantissas of any negative addend, and any minuend in any subtraction operation, for input to said compressor.

16. The device of claim 8 wherein:
said floating-point addition operations include one or both of negative addends and subtraction operations; and
said numbers are signed numbers having sign bits as part of their mantissas; said device further comprising:
logic configured to count subtraction control bits associated with said numbers for input to said compressor.

17. A non-transitory machine-readable data storage medium encoded with machine-executable instructions for configuring a programmable integrated circuit device to perform floating point addition operations on a more than two numbers, each of said numbers being represented by a respective mantissa and a respective exponent, said instructions comprising:
instructions to configure logic of said programmable integrated circuit device to determine a largest exponent of said respective exponent of said more than two numbers, and to subtract each respective said exponent from said largest exponent to determine a respective shifting amount, and to select said largest exponent as a resultant exponent;
instructions to configure logic of said programmable integrated circuit device to shift each respective mantissa of said more than two numbers by said respective shifting amount;
instructions to configure a compressor in said programmable integrated circuit device to simultaneously combine said more than two shifted mantissas into a carry vector and a save vector; and
instructions to configure a carry-propagate adder in said programmable integrated circuit device to combine said carry vector and said save vector.

18. The non-transitory machine-readable data storage medium of claim 17 wherein said instructions to configure logic of said programmable integrated circuit device to determine a largest exponent comprise instructions to configure logic of said programmable integrated circuit device to perform a binary sort.

19. The non-transitory machine-readable data storage medium of claim 17 wherein said instructions further comprise instructions to configure logic of said programmable integrated circuit device to normalize said resultant mantissa by a left-shift amount and to reduce said resultant exponent by said left-shift amount.

20. The non-transitory machine-readable data storage medium of claim 19 wherein said instructions to configure logic of said programmable integrated circuit device to normalize said resultant mantissa by a left-shift amount and to reduce said resultant exponent by said left-shift amount comprise instructions to configure logic of said programmable integrated circuit device to determine said left-shift amount by counting leading zeroes in said resultant mantissa when said resultant mantissa represents an unsigned number or a positive signed number, and by counting leading ones in said resultant mantissa when said resultant mantissa represents a negative signed number.

21. The non-transitory machine-readable data storage medium of claim 19 wherein said instructions further comprise instructions to configure logic of said programmable integrated circuit device to round said normalized resultant mantissa and said reduced resultant exponent to produce a final mantissa and a final exponent.

22. Circuitry for performing floating point addition operations on more than two numbers, each of said numbers being represented by a respective mantissa and a respective exponent, said circuitry comprising:

logic to determine a largest exponent of said respective exponent of said more than two numbers, and to subtract each respective said exponent from said largest exponent to determine a respective shifting amount, and to select said largest exponent as a resultant exponent;

logic to shift each respective mantissa of said more than two numbers by said respective shifting amount;

a compressor to simultaneously combine said more than two shifted mantissas into a carry vector and a save vector; and logic to combine said carry vector and said save vector.

23. The circuitry of claim 22 wherein said logic to combine said carry vector and said save vector comprises a carry-propagate adder.

24. The circuitry of claim 22 wherein said logic to determine a largest exponent comprises binary sort logic.

25. The circuitry of claim 22 further comprising logic to normalize said resultant mantissa by a left-shift amount and to reduce said resultant exponent by said left-shift amount.

26. The circuitry of claim 25 wherein said logic to normalize said resultant mantissa by a left-shift amount and to reduce said resultant exponent by said left-shift amount comprises count-leading-zeroes logic to count leading zeroes in said resultant mantissa to determine said left-shift amount when said resultant mantissa represents an unsigned number or a positive signed number, and count-leading-ones logic to count leading ones in said resultant mantissa to determine said left-shift amount when said resultant mantissa represents a negative signed number.

27. The circuitry of claim 25 further comprising logic to round said normalized resultant mantissa and said reduced resultant exponent to produce a final mantissa and a final exponent.

28. The circuitry of claim 22 wherein:

said floating-point addition operations include one or both of negative addends and subtraction operations; and said numbers are unsigned numbers having mantissas and separate sign bits; said circuitry further comprising:

logic to count each of said numbers having a sign bit equal to 1, representing a negative addend or a subtraction, for input to said compressor; and logic to invert said mantissas of any negative addend, and any minuend in any subtraction operation, for input to said compressor.

29. The circuitry of claim 22 wherein:

said floating-point addition operations include one or both of negative addends and subtraction operations; and said numbers are signed numbers having sign bits as part of their mantissas; said circuitry further comprising:

logic to count subtraction control bits associated with said numbers for input to said compressor.

\* \* \* \* \*